Figure 1:
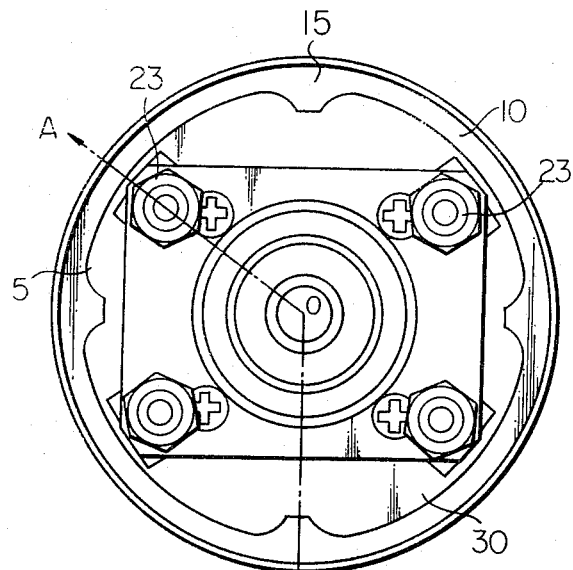

United States Patent [19]
Takahashi et al.

[11] 3,848,431
[45] Nov. 19, 1974

[54] AUTOMOTIVE VIBRATION ABSORBING JOINT ASSEMBLY

[75] Inventors: Koichi Takahashi; Keizaburo Usui; Eiichi Abe, all of Yokohama City; Kiyotaka Ozaki, Yokosuka, all of Japan

[73] Assignee: Nissan Motor Company, Limited, Yokohama City, Japan

[22] Filed: May 10, 1973

[21] Appl. No.: 358,924

[30] Foreign Application Priority Data
May 17, 1972 Japan.................................. 47-48948

[52] U.S. Cl................. 64/27 NM, 64/11 R, 64/1 V, 64/14
[51] Int. Cl............................................. F16d 3/14
[58] Field of Search ...... 64/27 NM, 27 R, 14, 11 R, 64/1 V, 13

[56] References Cited
UNITED STATES PATENTS
| | | | |
|---|---|---|---|
| 1,868,163 | 7/1932 | Evans | 64/27 NM |
| 2,041,507 | 5/1936 | Zeder | 64/27 R |
| 2,107,689 | 2/1938 | Bugatti | 64/13 |
| 2,250,448 | 7/1941 | Edwards | 64/20 NM |
| 2,691,283 | 10/1954 | Stover | 64/27 NM |
| 2,727,368 | 12/1955 | Morton | 64/11 R |

FOREIGN PATENTS OR APPLICATIONS
| | | | |
|---|---|---|---|
| 1,192,727 | 3/1957 | France | 64/11 R |
| 907,740 | 10/1962 | Great Britain | 64/11 R |

*Primary Examiner*—Samuel Scott
*Assistant Examiner*—Randall Heald
*Attorney, Agent, or Firm*—Robert E. Burns; Emmanuel J. Lobato; Bruce L. Adams

[57] ABSTRACT

A joint for use in an automotive drive line comprising a resilient member such that torque may be effectively transmitted by the joint but vibrations introduced at one end of the joint will be absorbed therein and will not appear at the other end.

5 Claims, 2 Drawing Figures

3,848,431

AUTOMOTIVE VIBRATION ABSORBING JOINT ASSEMBLY

This invention generally relates to a joint assembly, and more specifically to a torque transmitting connection between a propeller shaft and a final drive unit of a motor vehicle.

The final drive line of a motor vehicle typically comprises a propeller shaft extending from the transmission unit, a pinion drive shaft connected through a universal joint to the end of the propeller shaft, and a final drive gearing including a drive pinion gear of a differential unit carried on the pinion drive shaft. The plurality of gears involved in the final drive gearing sometimes produces noises and oscillations due to chipped or worn gear teeth, incorrect meshing of gear teeth, or other common causes. Such noises and vibrations may be transferred to the vehicle body through the final drive line and transmission unit. It might be possible to reduce these noises and vibrations to a certain extent by improving the manufacturing accuracy of the gear teeth or reducing engine torque variations. However, such measures can be effective only where the amplitude of such vibrations, or the exciting force produced in the gearing is relatively low. Moreover, a resonant effect is often encountered in many parts of the vehicular system; when the frequency of an exciting force, with whatever small amplitude, corresponds to a resonant frequency of some mechanical member of the vehicle structure, a significantly high resonant amplitude is produced. As a result, the vehicle occupant or occupants will suffer an unpleasant sensation of noises and vibrations in the passenger compartment.

These conditions may be alleviatted if the vibrations are absorbed before reaching the propeller shaft by a suitable absorbing means employed between the final drive unit and the propeller shaft which is designed to absorb vibrations within the range of the resonant frequencies of the mechanical members comprising the motor vehicle.

It is therefore a main object of the present invention to provide an improved joint assembly especially incorporated in a final drive line of a motor vehicle and having the above described properties, although the joint assembly may advantageously employed in other applications.

Another object of the present invention is to provide a flexible joint of the character described, which can dependably transmit torque from one end to the other.

Other objects of the present invention are simplicity and economy of construction.

According to an embodiment of the present invention, a joint assembly is disposed between the propeller shaft and pinion drive shaft of a motor vehicle. This assembly essentially comprises a first member driven by the propeller shaft preferably through a usual Hooke's type universal joint, a second member rotatably secured to a flange portion of the pinion drive shaft, and a resilient member connecting above mentioned two members. The resilient member has a dual function of transmitting torque from the first member to the second member, and absorbing vibrations introduced to the joint assembly at the pinion drive shaft. This absorption of vibrations is achieved without affecting the torque transmitting characteristics of the final drive line. The assembly in its entirety acts also as an inertial mass which is rotatable about the axis of the pinion drive shaft. If the resiliency of the resilient member and the moment of inertial of the inertial mass are appropriately chosen, the joint assembly will effectively absorb vibrations throughout the range of resonant frequencies of the mechanical members of the motor vehicle structure.

Further according to the present invention, the first member is formed with an axial bore, within which a cylindrical member is received by means of an arrangement comprising radial and axial bearing means, the arrangement providing radial and axial alignment of the first and second members, and limited relative radial and axial displacement respectively therebetween.

Furthermore according to the present invention, an excessive angular movement of the second member relative to the first member is restrained by a plurality of stop means formed on the first member so as to prolong the life of the resilient member connecting the above-mentioned two members.

Figure 2:
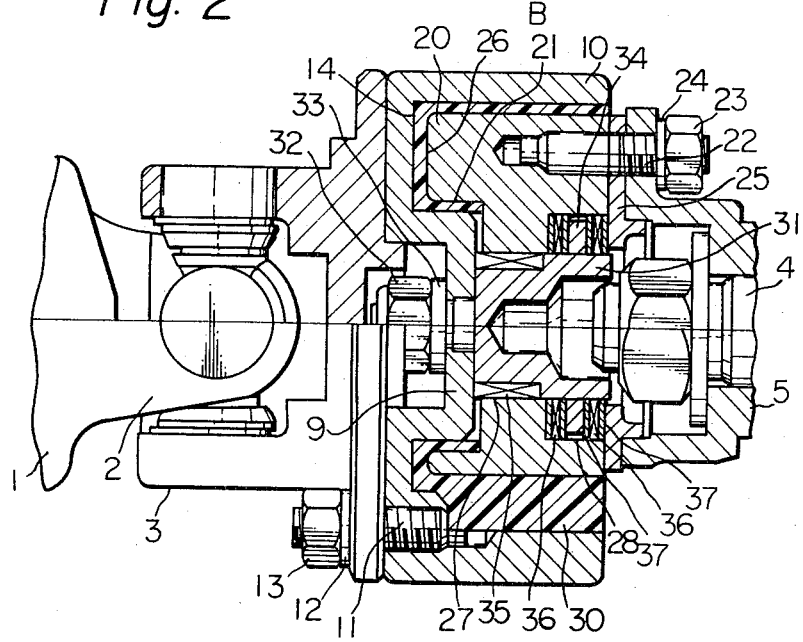

Other objects and features of the invention will now be described by way of example with reference to the accompanying drawings in which:

FIG. 1 is a rear end view of an embodiment of a joint assembly according to the present invention; and FIG. 2 is a sectional view taken through a line A–O–B of FIG. 1.

As shown, an embodiment of a joint assembly according to the invention is incorporated between a yoke 3 of a Hooke's type universal joint 2 at the end of a propeller shaft 1, and a flange 5 of a pinion drive shaft 4, thus transmitting torque from the propeller shaft 1 to the pinion drive shaft 4. An annular member 10, an open end of which faces the pinion drive shaft 4, has an end wall 14 adjacent to the propeller shaft 1 which is secured to the yoke 3 of the universal joint 2 by means such as bolts 11. The end wall 14 has a central stepped up portion 9 formed as shown. A substantially square block 20 is received into the annular member 10 in a way which is described below. An end (no numeral) of the block 20 facing the pinion drive shaft 4 is secured to the flange 5 by means such as bolts 22 and a retaining plate 25. The block 20 has an axial bore section 21 extending from an end 26 of the block 20 adjacent to the end wall 14 of the annular member 10 partially into the block 20 and receiving therein the stepped up portion 9 of the end wall 14. A substantial clearance is provided both radially and axially between adjacent surfaces of the annular member 10 and the block 20. In this clearance there is received a resilient member 30 of, for example, hard rubber, which rotatably drivably connects the annular member 10 and the block 20 and absorbs any vibrations introduced at the pinion drive shaft 4, thus preventing vibrations from being transmitted through the joint assembly to the propeller shaft 1.

As shown in FIG. 1, the annular member 10 is formed with a plurality of, preferably four projections 15 which extend radially inwardly from the inner face of the annular member 10 and are equidistantly spaced from one another. Accordingly, the four corners (no numeral) of the square block 20 will abut against the respective projections 15 for avoiding excessive angular movement of the square block 20 relative to the annular member 10. Such an excessive stress as to break down the resilient member 30 which would otherwise be caused by the excessive angular movement of the square block 20, is prevented thereby.

The block 20 has also formed therein a bore 27 extending from an end (no numeral) of the block 20 adjacent to the flange 5 into the block 20 and communicating with the bore section 21. The bore 27 has an enlarged portion 28 adjacent to the flange 5. A stepped cylindrical member 31, which extends substantially throughout the length of the bore 27, is rotatably received in the bore 27 by means of a needle bearing 35 which is disposed in the bore 27 between the bore section 21 and the enlarged portion 28. The stepped cylindrical member 31 is fixed, at its end (no numeral) adjacent to the central portion 9 of the end wall 14, to the central portion 9 by means such as a bolts 33. The stepped cylindrical member 31 has a radial flange 34 on an outer periphery thereof. A pair of thrust bearings 36 are mounted on member 31, one on each side respectively of the radial flange 34 by means such as bushings 37. The stepped cylindrical member 31 having thereon the radial flange 34 and the thrust bearings 36 are operatively received as a unit in the enlarged portion 28 of the bore 27.

It will be understood that the stepped cylindrical member 31 is held in rigid coaxial alignment with the annular member 10 by means of the bolt 33. It is also clear that the bore 27 of the block 20 is maintained in coaxial alignment with the stepped cylindrical member 31 by means of the needle bearing 35. By the means thus described, it will be understood that the yoke 3 of the universal joint 2 is maintained in rotatable coaxial alignment with the flange 5 of the pinion drive shaft 4 throughout operation of the joint assembly. In a similar manner, a limited amount of longitudinal relative movement is allowed between the yoke 3 and the flange 5 by means of the arrangement of the stepped cylindrical member 31 having thereon the radial flange 34 and carrying thereon the thrust bearings 36, which is operatively received in the enlarged portion 28 of the bore 27.

Thus, during operation of the joint assembly, torque is introduced by the propeller shaft 1 through the universal joint 2 and the yoke 3 to the annular member 10. The torque is then transferred to and through the resilient member 30 to the block 20, and subsequently through the retaining plate 25 and the flange 5 to the pinion drive shaft 4 for driving the motor vehicle.

Rotational and longitudinal vibrations introduced to the pinion drive shaft 4 from the final drive unit are transferred to the block 20 and then to the resilient member 30, but are absorbed by the resilient member 30 and do not appear at the yoke 3 of the universal joint 2, and are not transferred through the propeller shaft 1 to the vehicle body.

What is claimed is:

1. In a final drive line of a motor vehicle, the improvement comprising, in combination, a propeller shaft and a final pinion drive shaft, a universal joint attached to the rear end of said propeller shaft and having a yoke portion, a flange attached to the front end of said final pinion drive shaft, and an additional joint including an annular member secured to said yoke portion of said universal joint, an intermediate member received in said annular member and secured to said flange of said final pinion drive shaft, said intermediate member being spaced axially and radially apart from said annular member, a resilient member filling a space formed between said annular member and said intermediate member and drivably connecting said annular member and said intermediate member, said intermediate member having an axial bore formed therethrough, a cylindrical member extending through said axial bore and secured at its front end to said annular member, a needle bearing carried on said cylindrical member for maintaining the rotary axis of said cylindrical member in alignment with the rotary axis of said intermediate member, a radial flange formed on said cylindrical member and a pair of thrust bearings mounted on both sides respectively of said radial flange on said cylindrical member for thereby carrying an axial thrust force applied to said annular member and said intermediate member in either direction.

2. A joint assembly for a torque transmitting drive line having a rotary drive member and a rotary driven member, comprising a connecting member drivable by the drive member to rotate therewith, an intermediate member received in said connecting member forming a clearance therebetween, said intermediate member having an axial bore, a resilient member filling the clearance between said connecting member and said intermediate member and drivingly connecting said connecting member with said intermediate member for driving the driven member, a cylindrical member extending through the axial bore and secured at one end to said connecting member to rotate therewith, and a needle bearing rotatably supporting said cylindrical member in said intermediate member.

3. A joint assembly as claimed in claim 2, including a radial flange on an outer periphery of said cylindrical member, and a pair of thrust bearings, one on each side of said radial flange, in said intermediate member.

4. A joint assembly for a torque transmitting drive line having a propeller shaft and a final pinion drive shaft of a motor vehicle, comprising a universal joint secured to an end of the propeller shaft, an annular member secured to said universal joint to rotate therewith, an intermediate member received in said annular member and spaced axially and radially apart from said annular member to form a space therebetween, said intermediate member being secured to the final pinion drive shaft to rotate therewith and having an axial bore, a resilient member filling the space between said annular member and said intermediate member, a cylindrical member received in said axial bore and secured at one end to said annular member, said annular member having an end wall facing said propeller shaft, said end wall having a central stepped up portion projecting toward said pinion drive shaft, said intermediate member being a substantially square block and having an end face facing said end wall and matching the shape of said end wall, first means for maintaining the rotary axis of said annular member in alignment with the rotary axis of said intermediate member, and second means for carrying an axial thrust force between said annular and intermediate members, said first means including a needle bearing provided on the outer periphery of said cylindrical member.

5. A joint assembly as claimed in claim 4, wherein said second means includes a radial flange formed on the outer periphery of said cylindrical member and a pair of thrust bearing, one on each side of said radial flange.

* * * * *